United States Patent
Kim et al.

(10) Patent No.: US 8,885,556 B2
(45) Date of Patent: Nov. 11, 2014

(54) METHOD FOR PERFORMING A HARQ IN A MULTIPLE CARRIER SYSTEM

(75) Inventors: So Yeon Kim, Anyang-si (KR); Jae Hoon Chung, Anyang-si (KR); Yeong Hyeon Kwon, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 367 days.

(21) Appl. No.: 13/122,928

(22) PCT Filed: Oct. 7, 2009

(86) PCT No.: PCT/KR2009/005725
§ 371 (c)(1),
(2), (4) Date: Apr. 6, 2011

(87) PCT Pub. No.: WO2010/044564
PCT Pub. Date: Apr. 22, 2010

(65) Prior Publication Data
US 2011/0194500 A1    Aug. 11, 2011

Related U.S. Application Data

(60) Provisional application No. 61/105,795, filed on Oct. 15, 2008.

(30) Foreign Application Priority Data

May 28, 2009    (KR) .................. 10-2009-0047106

(51) Int. Cl.
*H04W 28/06* (2009.01)
*H04L 1/18* (2006.01)
*H04L 5/00* (2006.01)
*H04L 1/00* (2006.01)

(52) U.S. Cl.
CPC ............ *H04L 1/1854* (2013.01); *H04L 5/0007* (2013.01); *H04L 5/001* (2013.01); *H04L 5/0053* (2013.01); *H04L 1/0067* (2013.01); *H04L 1/1812* (2013.01); *H04L 5/0064* (2013.01)
USPC ......................................................... 370/328

(58) Field of Classification Search
CPC ....................................................... H04L 1/0078
USPC .................................................. 370/328, 210
See application file for complete search history.

(56) References Cited

U.S. PATENT DOCUMENTS

| | | | |
|---|---|---|---|
| 6,301,249 B1 * | 10/2001 | Mansfield et al. | ............ 370/394 |
| 2003/0135640 A1 * | 7/2003 | Ho et al. | ........................ 709/237 |
| 2007/0041349 A1 | 2/2007 | Kim et al. | |
| 2009/0073922 A1 * | 3/2009 | Malladi et al. | ................ 370/328 |
| 2009/0129259 A1 * | 5/2009 | Malladi et al. | ................ 370/210 |
| 2010/0034139 A1 * | 2/2010 | Love et al. | .................... 370/328 |

FOREIGN PATENT DOCUMENTS

| | | |
|---|---|---|
| KR | 2001-0074801 A | 8/2001 |
| KR | 10-2007-0021725 A | 2/2007 |

* cited by examiner

*Primary Examiner* — Ricky Ngo
*Assistant Examiner* — Ben H Liu
(74) *Attorney, Agent, or Firm* — Birch, Stewart, Kolasch, Birch, LLP

(57) ABSTRACT

A method of performing hybrid automatic repeat request (HARQ) in a multiple carrier system is provided. A user equipment receives a plurality of downlink data through a plurality of downlink carriers and transmits one acknowledgement (ACK)/not-acknowledgement (NACK) signal for the plurality of downlink data through an uplink carrier. The ACK/NACK signal is an ACK signal when all of the plurality of downlink data are successfully received.

12 Claims, 25 Drawing Sheets

METHOD FOR PERFORMING A HARQ IN A MULTIPLE CARRIER SYSTEM

This application is the National Phase of PCT/KR2009/005725 filed on Oct. 7, 2009, which claims priority under 35 U.S.C. 119(e) to U.S. Provisional Application No. 61/105,795 filed on Oct. 15, 2008 and under 35 U.S.C. 119(a) to Patent Application No. 10-2009-0047106 filed in Republic of Korea on May 28, 2009, all of which are hereby expressly incorporated by reference into the present application.

TECHNICAL FIELD

The present invention relates to wireless communications, and more particularly, to a wireless communication system supporting multiple carriers.

BACKGROUND ART

Wireless communication systems are widely spread all over the world to provide various types of communication services such as voice or data. In general, the wireless communication system is a multiple access system capable of supporting communication with multiple users by sharing available system resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

In a typical wireless communication system, one carrier is considered in general even if a bandwidth is differently configured between an uplink and a downlink. In $3^{rd}$ generation partnership project (3GPP) long term evolution (LTE), one carrier constitutes each of the uplink and the downlink on the basis of a single carrier, and the bandwidth of the uplink is symmetrical to the bandwidth of the downlink in general. However, except for some areas of the world, it is difficult to allocate frequencies of wide bandwidths. Therefore, as a technique for effectively using fragmented small bands, a spectrum aggregation technique is being developed to obtain the same effect as when a band of a logically wide bandwidth is used by physically aggregating a plurality of bands in a frequency domain. The spectrum aggregation includes a technique for supporting a system bandwidth of 100 mega Hertz (MHz) by using multiple carriers even if the 3GPP LTE supports a bandwidth of up to 20 MHz for example, and a technique for allocating an asymmetric bandwidth between the uplink and the downlink.

The 3GPP LTE is based on dynamic scheduling to transmit and receive downlink data and uplink data. For downlink data transmission, a base station (BS) first reports a downlink resource allocation (referred to as a downlink grant) to a user equipment (UE). The UE receives the downlink data by using a downlink resource indicated by the downlink resource allocation. To transmit the uplink date, the UE first transmits an uplink resource allocation request (referred to as a scheduling request) to the BS. Upon receiving the uplink resource allocation request, the BS reports an uplink resource allocation (referred to as an uplink grant) to the UE. The UE transmits the uplink data by using an uplink resource indicated by the uplink resource allocation.

Hybrid automatic repeat request (HARQ) is a scheme of increasing transmission efficiency by combining error correction and retransmission. The HARQ can be divided into synchronous HARQ and non-synchronous HARQ. In the synchronous HARQ, a transmitter and a receiver can know a retransmission time in advance. In the non-synchronous HARQ, the receiver cannot know a transmission time of the transmitter in advance.

How to perform HARQ is not introduced yet when dynamic scheduling is used in a multiple carrier system, i.e., a system using a plurality of uplink carriers and a plurality of downlink carriers.

DISCLOSURE

Technical Problem

The present invention provides a method and apparatus for performing hybrid automatic repeat request (HARQ) in a multiple carrier system.

The present invention also provides a method and apparatus for transmitting an acknowledgement (ACK)/not-acknowledgement (NACK) signal for HARQ in a multiple carrier system.

Technical Solution

In an aspect, a method of performing hybrid automatic repeat request (HARQ) by a user equipment in a multiple carrier system is provided. The method includes receiving a plurality of downlink data through a plurality of downlink carriers, and transmitting one acknowledgement (ACK)/not-acknowledgement (NACK) signal for the plurality of downlink data through an uplink carrier, wherein the ACK/NACK signal is an ACK signal when all of the plurality of downlink data are successfully received and the ACK/NACK signal is a NACK signal when even one of the plurality of downlink data is unsuccessfully received and the uplink carrier is associated with the plurality of downlink carriers.

Each downlink data may be received on a physical downlink shared channel (PDSCH) through each downlink carrier, and each PDSCH may be indicated by downlink control information (DCI) on a physical downlink control channel (PDCCH).

The method may further include transmitting reception information regarding downlink data which is successfully or unsuccessfully received.

The method may further include receiving transmission confirmation information regarding the number of the plurality of downlink data transmitted by a base station. Also, The method may further include transmitting, to the base station, reception confirmation information regarding the number of downlink data received by the user equipment.

The method may further include receiving information on the uplink carrier through which the ACK/NACK signal is transmitted through at least one downlink carrier among the plurality of downlink carriers.

Advantageous Effects

Hybrid automatic repeat request (HARQ) can be supported based on dynamic scheduling in a multiple carrier system. An overhead caused by feedback of an acknowledgement (ACK)/not-acknowledgement (NACK) signal is decreased, and resources can be effectively allocated.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the 3GPP LTE.

For clarity of explanation, the following description will focus on the 3GPP LTE/LTE-A. However, the technical features of the present invention are not limited thereto.

Figure 1:
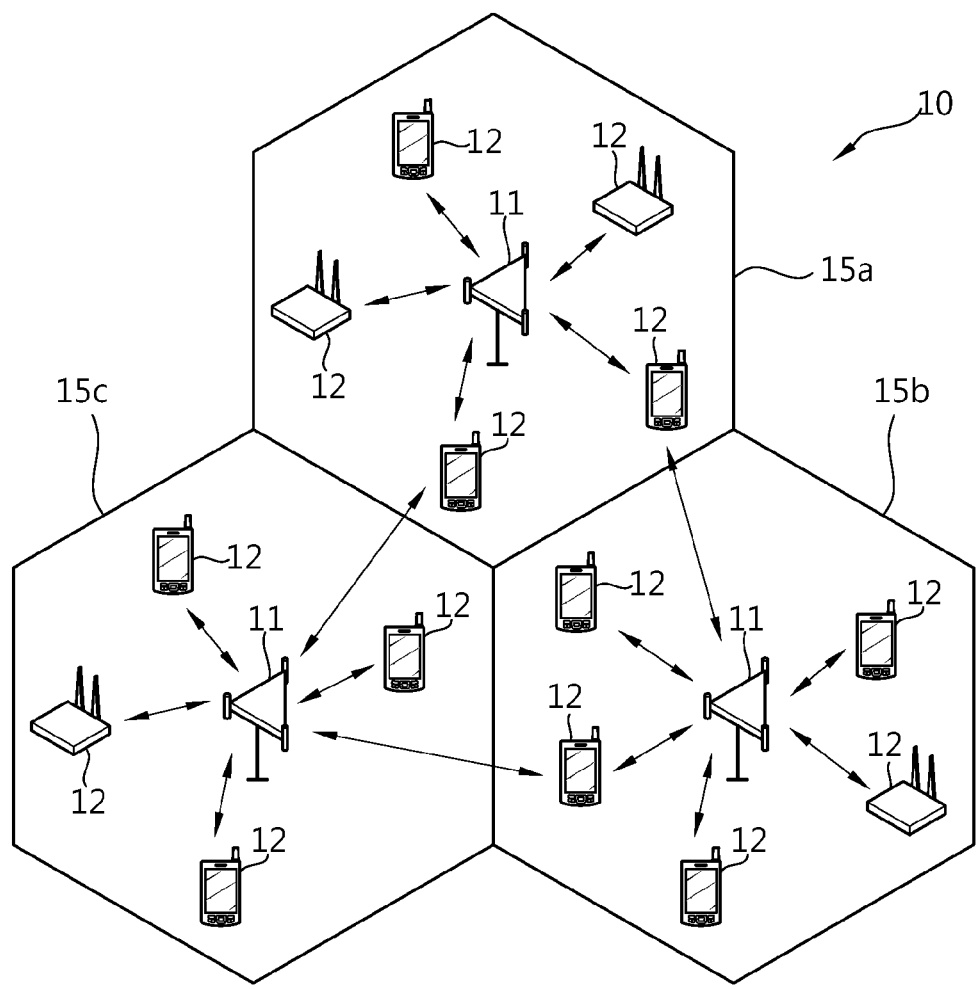
FIG. 1 shows a wireless communication system.

FIG. 1 shows a wireless communication system. Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 2:
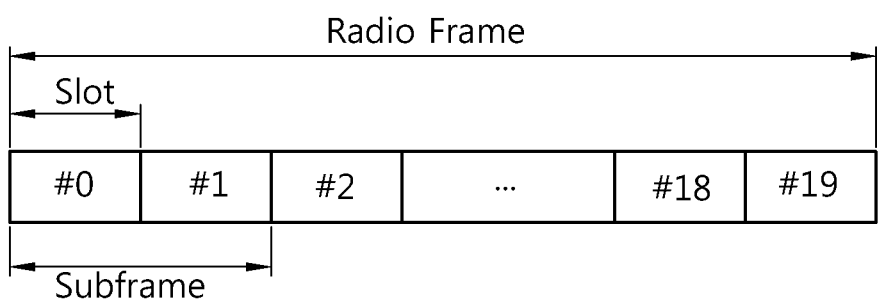
FIG. 2 shows a structure of a radio frame in $3^{rd}$ generation partnership project (3GPP) long term evolution (LTE).

FIG. 2 shows a structure of a radio frame in $3^{rd}$ generation partnership project (3GPP) long term evolution (LTE). The radio frame consists of 10 subframes, and one subframe consists of two slots. A time for transmitting one subframe is defined as a transmission time interval (TTI). For example, one subframe may have a length of 1 millisecond (ms), and one slot may have a length of 0.5 ms.

One slot includes a plurality of orthogonal frequency division multiplexing (OFDM) symbols in a time domain and includes a plurality of resource blocks (RBs) in a frequency domain. The OFDM symbol is for expressing one symbol period since the 3GPP LTE uses orthogonal frequency division multiple access (OFDMA) in DL transmission. According to a multiple access scheme, the OFDM symbol may be referred to as other terms. For example, the OFDM symbol may be referred to as a single carrier-frequency division multiple access (SC-FDMA) symbol when SC-FDMA is used as a UL multiple access scheme. An RB is a resource allocation unit and includes a plurality of consecutive subcarriers in one slot.

The structure of the radio frame is for exemplary purposes only, and thus the number of subframes included in the radio frame or the number of slots included in the subframe, and the number of OFDM symbols included in the slot may change variously.

Figure 3:
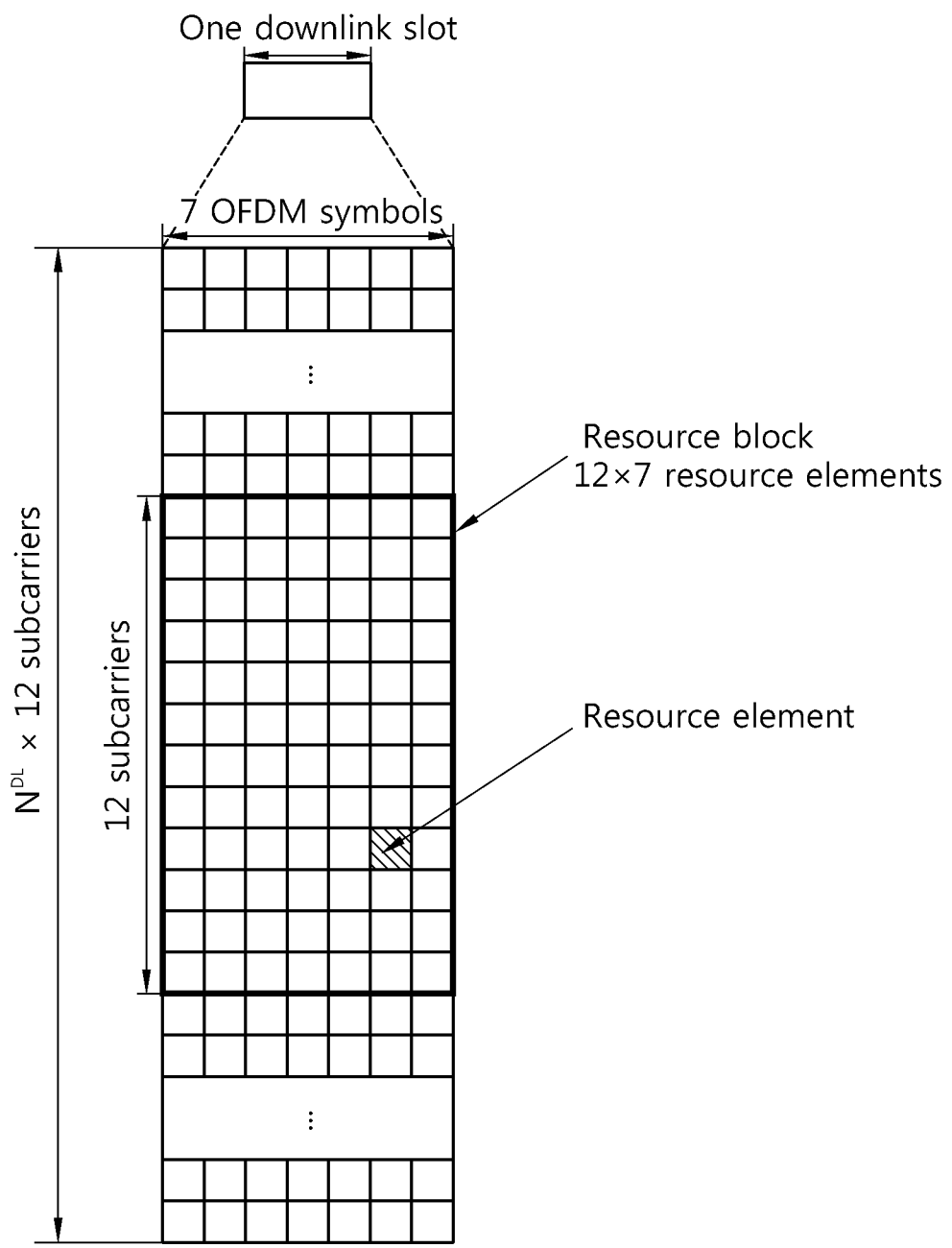
FIG. 3 shows an example of a resource grid for one downlink slot.

FIG. 3 shows an example of a resource grid for one DL slot. The DL slot includes a plurality of OFDM symbols in a time domain. It is described herein that one DL slot includes 7 OFDM symbols and one resource block includes 12 subcarriers for exemplary purposes only, and thus the present invention is not limited thereto. Each element on the resource grid is referred to as a resource element, and one resource block includes 12×7 resource elements. The number $N^{DL}$ of resource blocks included in the DL slot depends on a DL transmission bandwidth determined in a cell.

Figure 4:
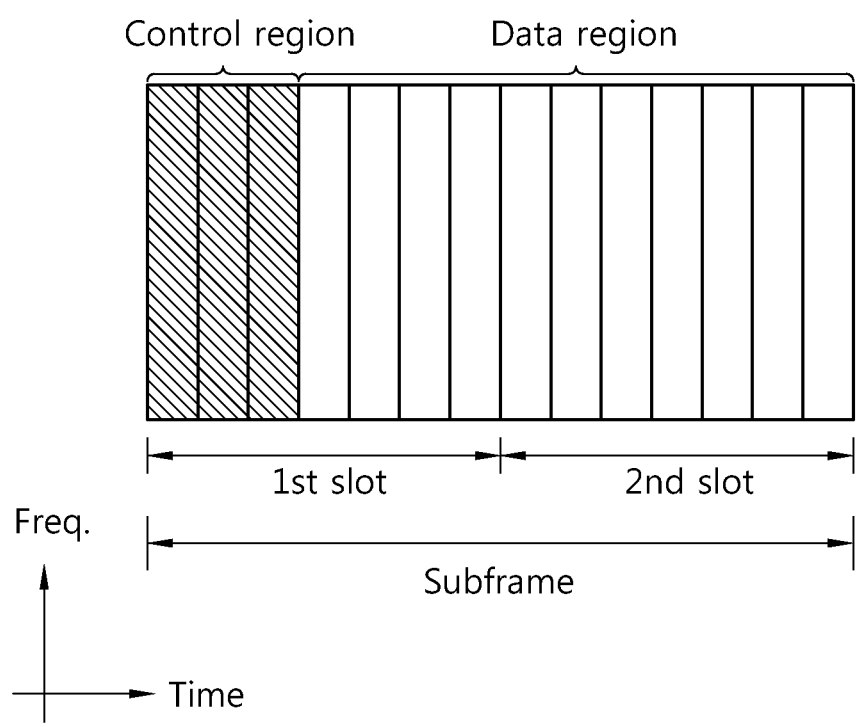
FIG. 4 shows a structure of a downlink subframe.

FIG. 4 shows a structure of a DL subframe. The subframe includes two slots in a time domain. A maximum of three OFDM symbols located in a front portion of a $1^{st}$ slot in a subframe correspond to a control region to be assigned with control channels. The remaining OFDM symbols correspond to a data region to be assigned with a physical downlink shared channel (PDSCH).

Examples of DL control channels used in the 3GPP LET include a physical control format indicator channel (PCFICH), a physical downlink control channel (PDCCH), a physical hybrid-ARQ indicator channel (PHICH), etc. The PCFICH transmitted in a $1^{st}$ OFDM symbol of a subframe carries information regarding the number of OFDM symbols (i.e., a size of a control region) used for transmission of control channels in the subframe. Control information transmitted on the PDCCH is referred to as downlink control information (DCI). The DCI transmits UL resource allocation information, DL resource allocation information, a UL transmit power control (TPC) command for any UE groups, etc. The PHICH carries an acknowledgement (ACK)/not-acknowledgement (NACK) signal for a UL hybrid automatic repeat request (HARQ). That is, the ACK/NACK signal for UL data transmitted by a UE is transmitted on the PHICH.

Now, a PDCCH that is a DL physical channel will be described.

Control information transmitted on the PDCCH is referred to as downlink control information (DCI). The following table shows the DCI according to a DCI format.

TABLE 1

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

A DCI format 0 indicates UL resource allocation information. DCI formats 1 to 2 indicate DL resource allocation information. DCI formats 3 and 3A indicate a UL transmit power control (TPC) command for any UE groups.

The following table shows information elements included in the DCI format 0 that is UL resource allocation information (or a UL grant). Section 5.3.3.1 of the 3GPP TS 36.212 V8.3.0 (2008-05) "Technical Specification Group Radio Access Network; Evolved Universal Terrestrial Radio Access (E-UTRA); Multiplexing and channel coding (Release 8)" may be incorporated herein by reference.

TABLE 2

Figure 5:
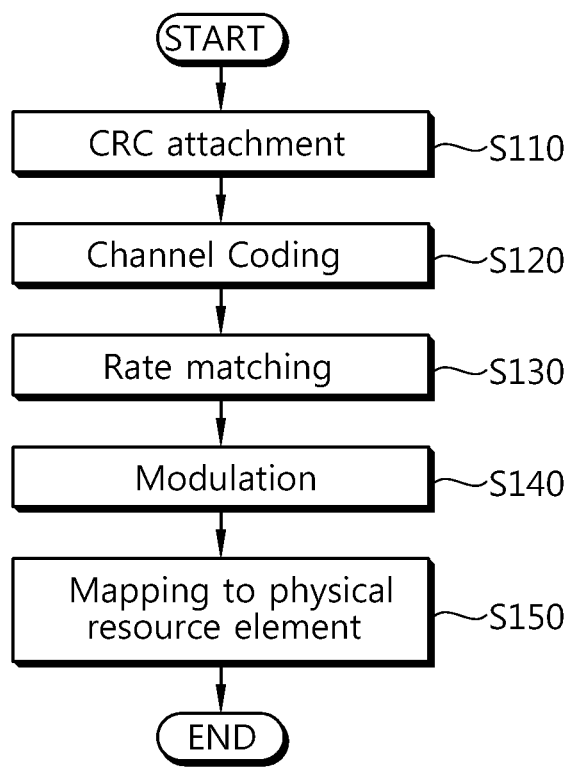
FIG. 5 is a flowchart showing a process of configuring a physical downlink control channel (PDCCH).

Flag for format0/format1A differentiation - 1 bit
Hopping flag - bit
Resource block assignment and hopping resource allocation -
  $\lceil \log_2(N_{RB}^{UL}(N_{RB}^{UL} + 1)/2) \rceil$ bits
    For PUSCH hopping:
      $N_{UL\_hop}$ bits are used to obtain the value of $\tilde{n}_{PRB}(i)$
      ($\lceil \log_2(N_{RB}^{UL}(N_{RB}^{UL} + 1)/2) \rceil - N_{UL\_hop}$) bits provide the
      resource allocation of the first slot in the UL subframe TABLE 2-continued For non-hopping PUSCH:
  ($\lceil \log_2(N_{RB}^{UL}(N_{RB}^{UL} + 1)/2) \rceil$) bits provide the resource
  allocation of the first slot in the UL subframe
Modulation and coding scheme and redundancy version - 5 bits
New data indicator - 1 bit
TPC command for scheduled PUSCH - 2 bits
Cyclic shift for DM RS - 3 bits
UL index (2 bits, this field just applies to TDD operation)
CQI request - 1 bit FIG. 5 is a flowchart showing a process of configuring a PDCCH. In step S110, a BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC. The following table shows an example of identifiers masked to the PDCCH.

TABLE 3

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

When the C-RNTI is used, the PDCCH carries control information for a specific UE, and when other RNTIs are used, the PDCCH carries common control information received by all or a plurality of UEs in a cell.

In step S120, channel coding is performed on the CRC-attached DCI to generate coded data. In step S130, rate matching is performed according to the number of CCEs assigned to the PDCCH format. In step S140, the coded data is modulated to generate modulation symbols. In step S150, the modulation symbols are mapped to physical resource elements.

A plurality of PDCCHs can be transmitted in one subframe. The UE monitors the plurality of PDCCHs for each subframe. Monitoring implies that the UE attempts decoding of each PDCCH according to a format of a PDCCH to be monitored. The BS does not provide the UE with information indicating where a corresponding PDCCH is located in a control region allocated in a subframe. Therefore, the UE monitors a set of PDCCH candidates in the subframe to find a PDCCH of the UE. This is referred to as blind decoding. For example, the UE detects a PDCCH having the DCI of the UE if a CRC error is not detected as a result of de-masking the C-RNTI of the UE from a corresponding PDCCH.

To receive DL data, the UE first receives a DL resource allocation on the PDCCH. Upon successfully detecting the PDCCH, the UE reads DCI on the PDCCH. The DL data is received on the PDSCH by using the DL resource allocation included in the DCI. Further, to transmit UL data, the UE first receives a UL resource allocation on the PDCCH. Upon successfully detecting the PDCCH, the UE reads the DCI on the PDCCH. The UL data is transmitted on a PUSCH by using the UL resource allocation included in the DCI.

Figure 6:
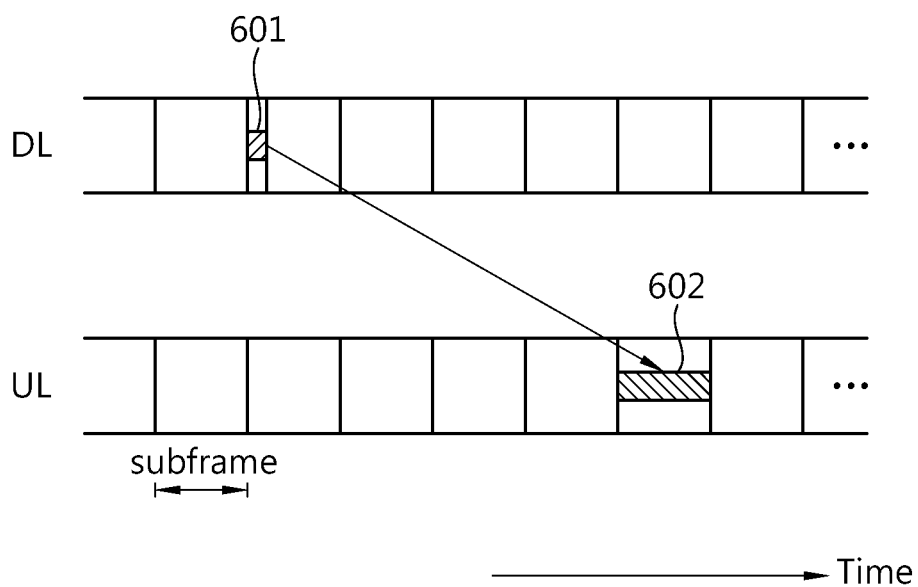
FIG. 6 shows an example of transmitting uplink data.

FIG. 6 shows an example of transmitting UL data. A UE transmits UL data on a PUSCH 602 indicated by a PDCCH 601. The UE monitors the PDCCH 601 in a DL subframe, and receives a DCI format 0, that is a UL resource allocation, on the PDCCH 601. UL data is transmitted on the PUSCH 602 configured based on the UL resource allocation.

Figure 7:
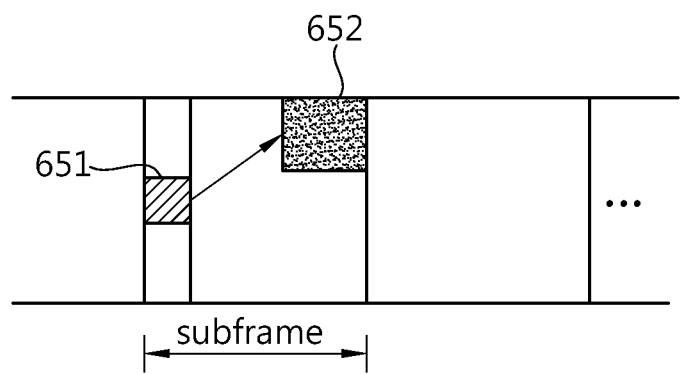
FIG. 7 shows an example of receiving downlink data.

FIG. 7 shows an example of receiving DL data. A UE receives DL data on a PDSCH 652 indicated by a PDCCH 651. The UE monitors the PDCCH 651 in a DL subframe, and receives DL resource allocation information on the PDCCH 651. The UE receives DL data on the PDSCH 652 indicated by the DL resource allocation information.

Figure 8:
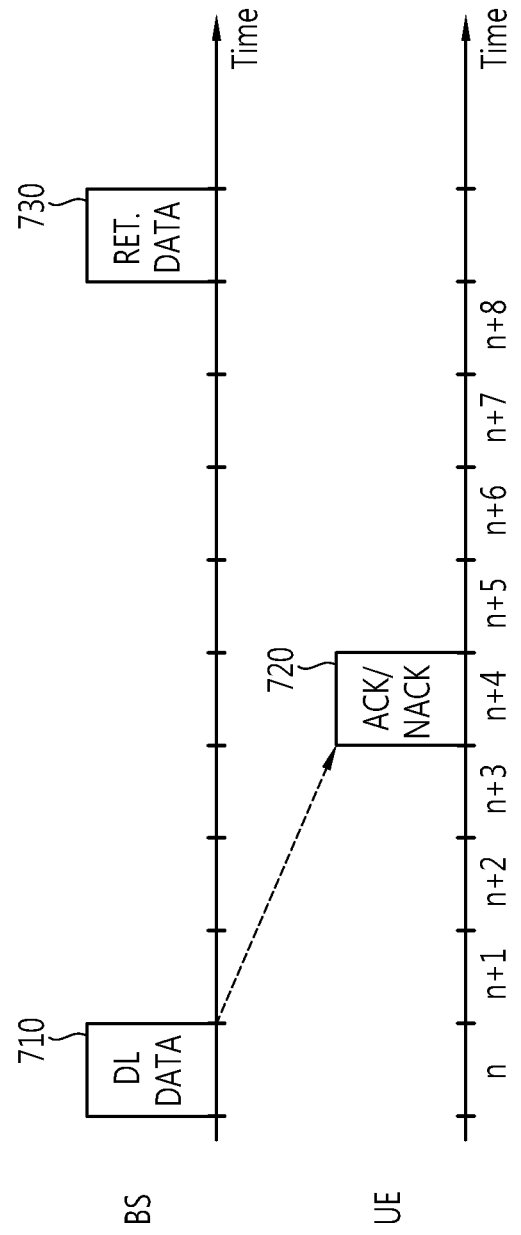
FIG. 8 shows downlink hybrid automatic repeat request (HARQ).

FIG. 8 shows DL hybrid automatic repeat request (HARQ). Upon receiving DL data 710 from a BS, a UE transmits an ACK/NACK signal 720 after a specific time elapses. Although it is shown herein that the DL data 710 is received in an $n^{th}$ subframe and the ACK/NACK signal 720 is transmitted in an $(n+4)^{th}$ subframe, this is for exemplary purposes only. The ACK/NACK signal 720 is an ACK signal when the DL data 710 is successfully decoded, and is an NACK signal when the DL data 710 is unsuccessfully decoded. Upon receiving the NACK signal, the BS may transmit retransmission data 730 of the DL data until the ACK signal is received or until the number of retransmissions reaches the maximum number of retransmissions.

A resource allocation or a transmission time of the ACK/NACK signal 720 for the DL data 710 may be dynamically reported by the BS through signaling, or may be agreed in advance according to resource allocation or a transmission time of the DL data 710.

Now, a multiple carrier system will be described.

The 3GPP LTE system supports a case where a DL bandwidth is configured differently from a UL bandwidth under the assumption that one carrier is used. This implies that the 3GPP LTE is supported only when the DL bandwidth is equal to or different from the UL bandwidth in a condition where one carrier is defined for each of a DL and a UL. For example, the 3GPP LTE system can support up to 20 MHz, and the UL bandwidth and the DL bandwidth may be different from each other, but in this case, only one carrier is supported for the UL and the DL.

Spectrum aggregation (also referred to as bandwidth aggregation or carrier aggregation) is for supporting a plurality of carriers. The spectrum aggregation is introduced to support an increasing throughput, to prevent cost rising caused by introduction of a broadband radio frequency (RF) device, and to ensure compatibility with a legacy system. For example, when 5 carriers are assigned with a granularity of a carrier unit having a bandwidth of 20 MHz, up to 100 MHz can be supported.

The spectrum aggregation can be classified into contiguous spectrum aggregation achieved between consecutive carriers in a frequency domain and non-contiguous spectrum aggregation achieved between discontinuous carriers. The number of carriers aggregated in the DL may be different from the number of carriers aggregated in the UL. Symmetric aggregation is achieved when the number of DL carriers is equal to the number of UL carriers. Asymmetric aggregation is achieved when the number of DL carriers is different from the number of UL carriers.

Multiple carriers may have different sizes (i.e., bandwidths). For example, when 5 carriers are used to configure a band of 70 MHz, the band can be configured as 5 MHz carrier (carrier #0)+20 MHz carrier (carrier #1)+20 MHz carrier (carrier #2)+20 MHz carrier (carrier #3)+5 MHz carrier (carrier #4). Symmetric aggregation is achieved when the number of DL carriers is equal to the number of UL carriers. Asymmetric aggregation is achieved when the number of DL carriers is different from the number of UL carriers.

Hereinafter, a multiple carrier system is a system supporting multiple carriers on the basis of spectrum aggregation. The multiple carrier system can use contiguous spectrum aggregation and/or non-contiguous spectrum aggregation, and also can use either symmetric aggregation or asymmetric aggregation. A different radio access technology (RAT) is applicable to each carrier. For example, 3GPP LTE is applicable to first and second carriers, and IEEE 802.16 is applicable to a third carrier.

Now, a technique for managing multiple carriers for the effective use of multiple carriers will be described. At least one medium access control (MAC) entity transmits and receives the multiple carriers by managing/operating at least one carrier. The MAC entity has a higher layer of a physical layer (PHY). For example, a MAC layer and/or a higher layer of the MAC layer can be implemented in the MAC entity.

Figure 9:
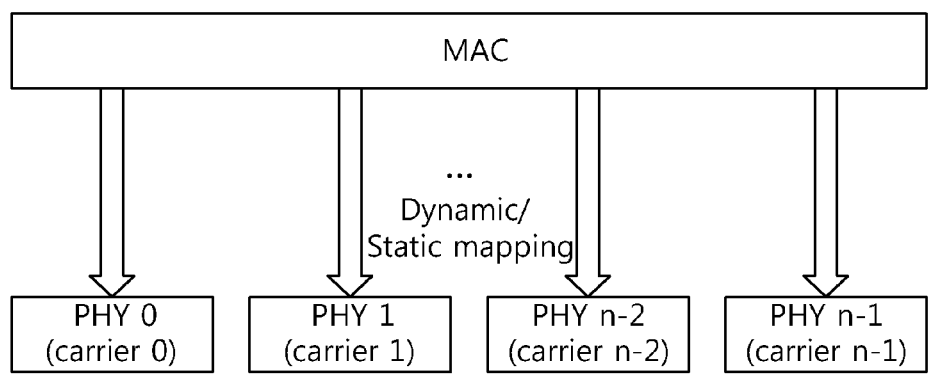
FIG. 9 shows an example of a transmitter in which one medium access control (MAC) operates multiple carriers.
Figure 10:
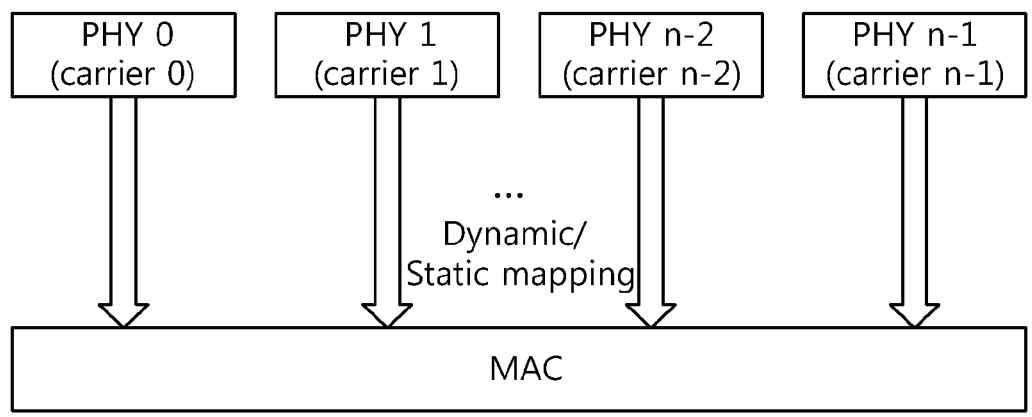
FIG. 10 shows an example of a receiver in which one MAC operates multiple carriers.

FIG. 9 shows an example of a transmitter in which one MAC operates multiple carriers. FIG. 10 shows an example of a receiver in which one MAC operates multiple carriers. One physical layer (PHY) corresponds to one carrier. A plurality of PHYs, i.e., PHY 0, . . . , PHY n−1, are operated by one MAC. Mapping between the MAC and the plurality of PHYs, i.e., PHY 0, . . . , PHY n−1, may be either dynamic mapping or static mapping. Advantageously, carriers managed by one MAC are more flexible in terms of resource management since the carriers do not have to be contiguous to each other.

Figure 11:
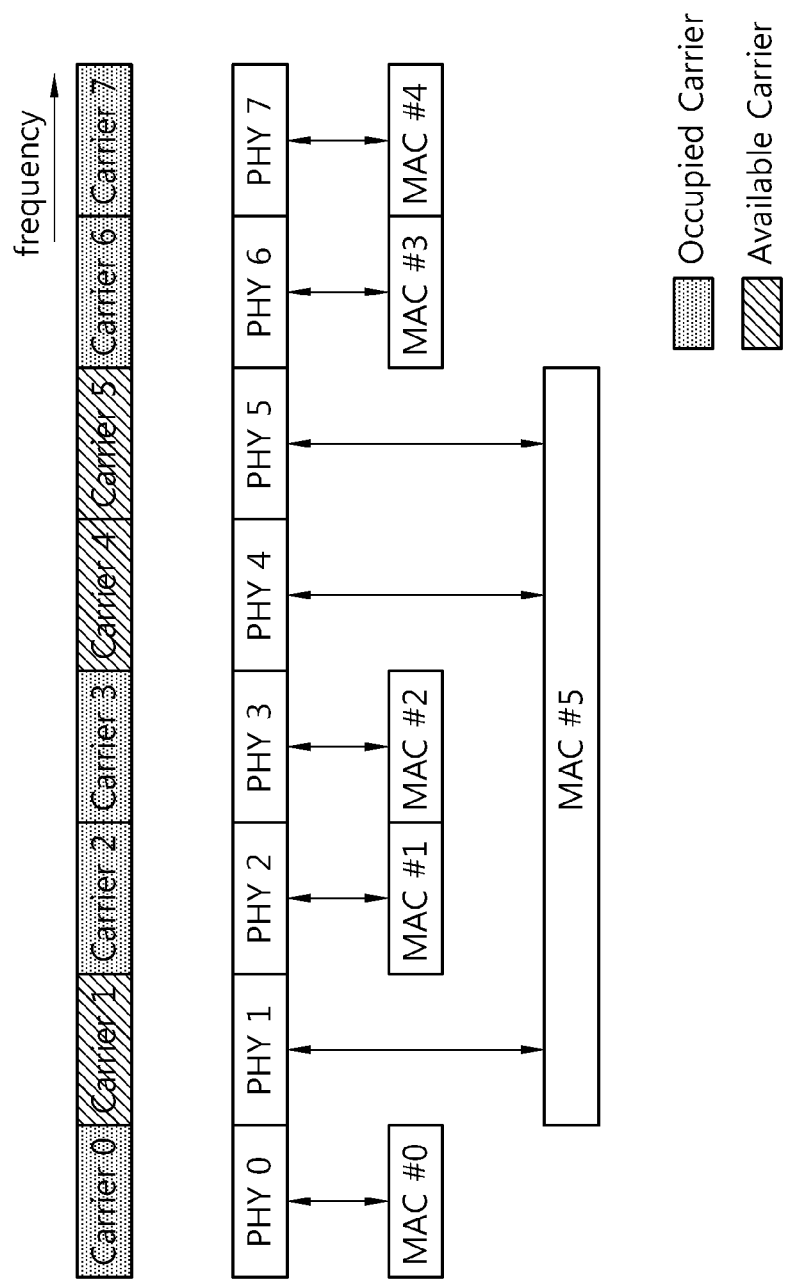
FIG. 11 shows an example of carrier allocation in a multiple carrier system.

FIG. 11 shows an example of carrier allocation in a multiple carrier system. Each of carriers 0, 2, 3, 6, and 7 corresponds to one PHY. Each PHY is managed by one MAC. PHYs 1, 4, and 5 corresponding to carriers 1, 4, and 5 are managed by one MAC #5. The carriers 1, 4, and 5 managed by the MAC #5 can be effectively managed even if they are not contiguous to each other. In FIG. 11, a carrier index, a PHY index, and a MAC index are for exemplary purposes only.

Figure 12:
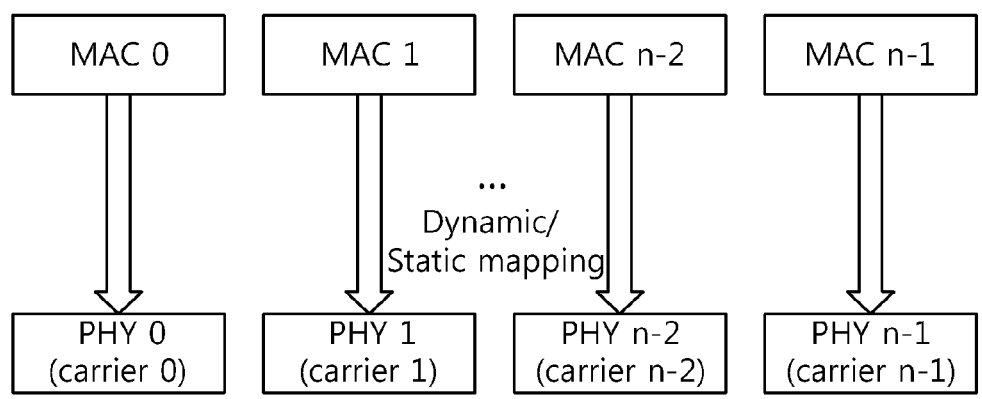
FIG. 12 shows an example of a transmitter in which multiple MACs operate multiple carriers.
Figure 13:
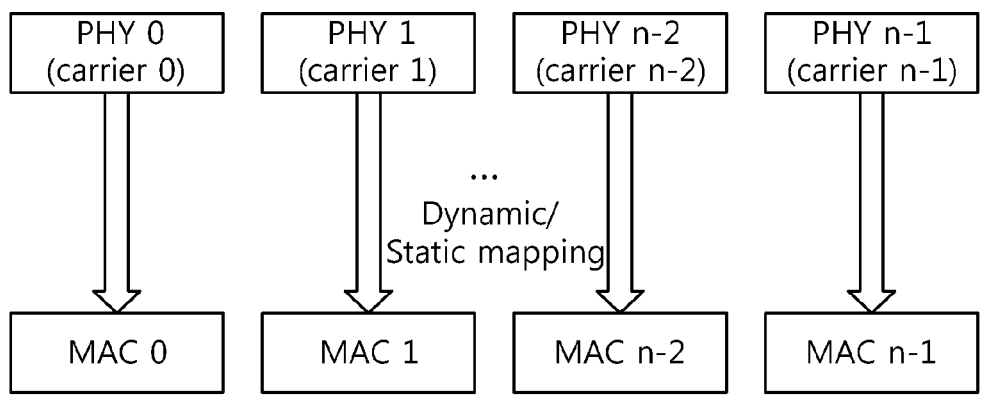
FIG. 13 shows an example of a receiver in which multiple MACs operate multiple carriers.

FIG. 12 shows an example of a transmitter in which multiple MACs operate multiple carriers. FIG. 13 shows an example of a receiver in which multiple MACs operate multiple carriers. Unlike in the embodiments of FIG. 9 and FIG. 10, a plurality of MACs, i.e., MAC 0, . . . , MAC n−1, are one-to-one mapped to a plurality of PHYs, i.e., PHY 0, . . . , PHY n−1.

Figure 14:
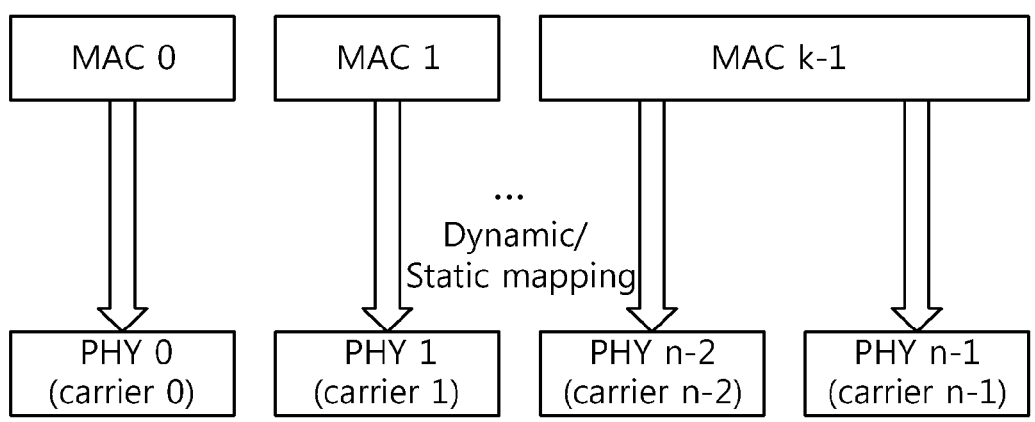
FIG. 14 shows another example of a transmitter in which multiple MACs operate multiple carriers.
Figure 15:
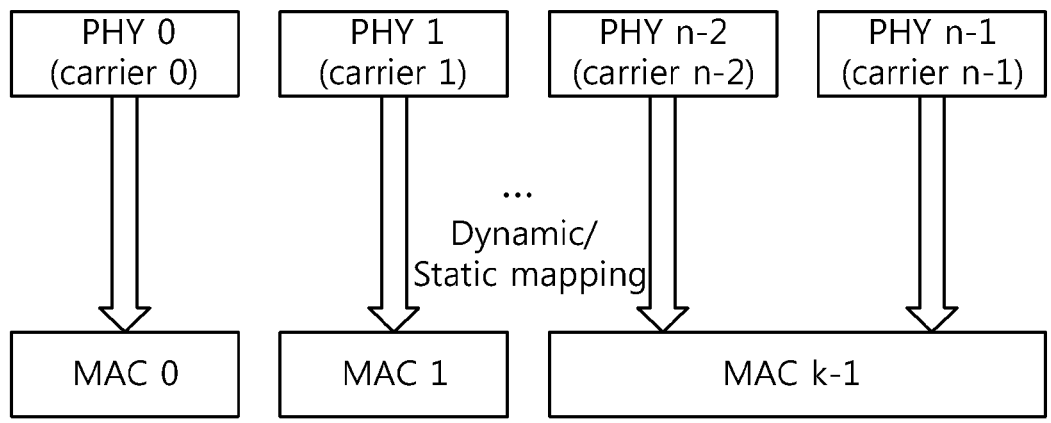
FIG. 15 shows another example of a receiver in which multiple MACs operate multiple carriers.

FIG. 14 shows another example of a transmitter in which multiple MACs operate multiple carriers. FIG. 15 shows another example of a receiver in which multiple MACs operate multiple carriers. Unlike in the embodiments of FIG. 12 and FIG. 13, a total number k of MACs is different from a total number n of PHYs. Some parts of the MACs, i.e., MAC 0 and MAC 1, are one-to-one mapped to PHYs, i.e., PHY 0 and PHY 1. A part of the MACs, i.e., MAC k−1, is mapped to a plurality of PHYs, i.e., PHY n−2 and PHY n−1.

Figure 16:
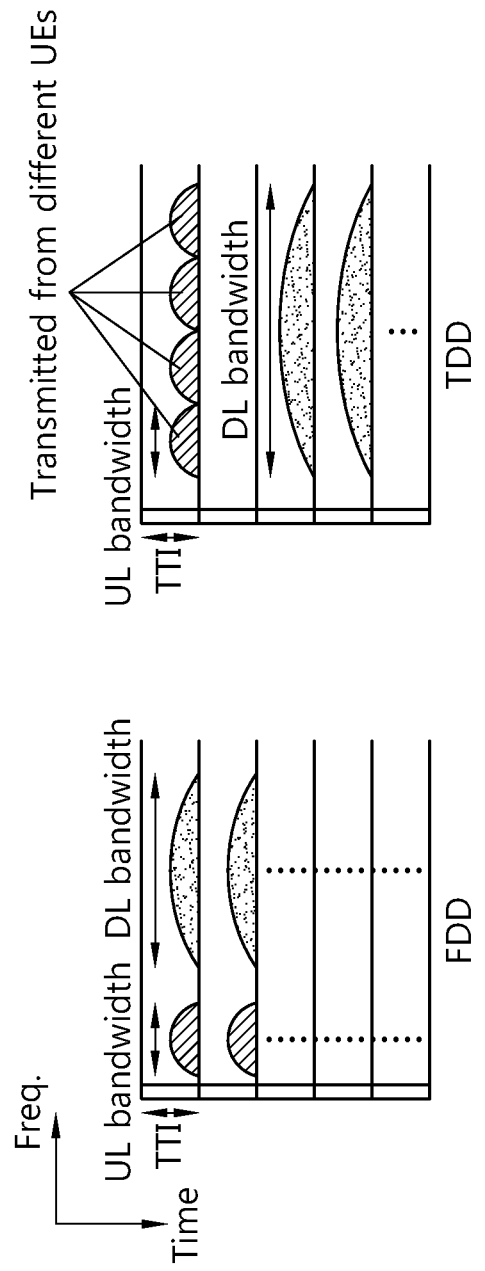
FIG. 16 shows an example of a structure in which uplink/downlink bandwidths are asymmetrically configured using frequency division duplex (FDD) and time division duplex (TDD) in a multiple carrier system.

FIG. 16 shows an example of a structure in which UL/DL bandwidths are asymmetrically configured using frequency division duplex (FDD) and time division duplex (TDD) in a multiple carrier system. Although it is shown in the example of FIG. 16 that a DL bandwidth is greater than a UL bandwidth, the present invention is not limited to an asymmetric structure, and thus the UL bandwidth may be greater than the DL bandwidth. When using the FDD in the example of FIG. 16, the DL bandwidth is greater than the UL bandwidth. Each bandwidth may use a plurality of carriers. When using the TDD in the example of FIG. 16, the UL bandwidth uses 4 carriers, and the DL bandwidth uses one carrier. In this case, it is shown that the UL bandwidth is smaller than the DL bandwidth, and thus a aggregated full UL carrier bandwidth is equal to one DL bandwidth.

In spectrum aggregation in which a bandwidth of a carrier is smaller than a system bandwidth (BW), a BW of each carrier can be configured by using various methods. This implies that the number of carriers in use or the BW of the carrier can be set differently according to the system BW. A basic frequency block is a frequency band which is basically used or allocated to support the system BW in a frequency allocation process.

Figure 17:
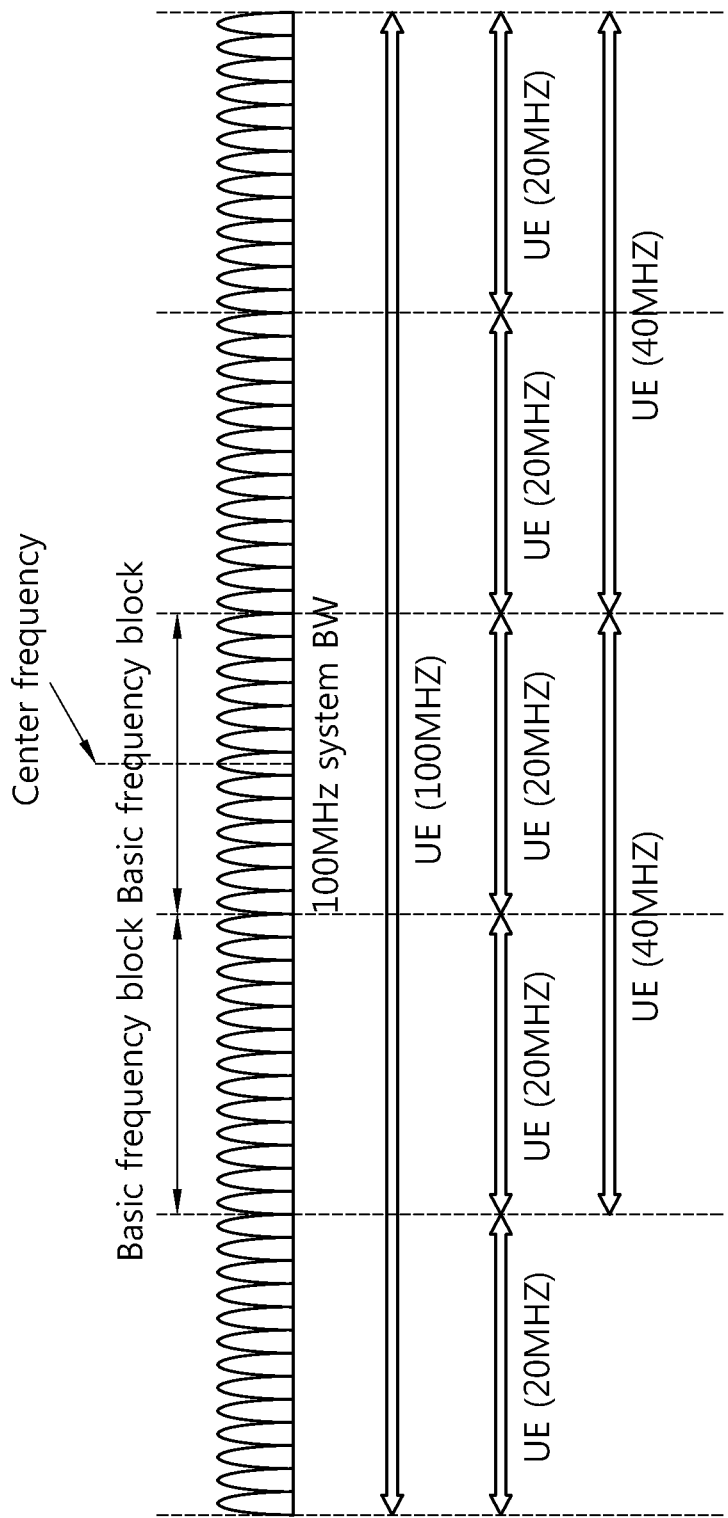
FIG. 17 shows an example of configuring a bandwidth of a carrier.

FIG. 17 shows an example of configuring a BW of a carrier. In order to support a system BW of 100 MHz, basic frequency blocks are symmetrically allocated about a center frequency. For example, the basic frequency block is set to a BW of 20 MHz, and a carrier is allocated to each UE on a basic frequency block basis. The center frequency is a frequency which is used as a reference to symmetrically allocate the basic frequency blocks. Herein, the center frequency is a frequency corresponding to the center of the basic frequency block located in a center portion of the system BW.

Figure 18:
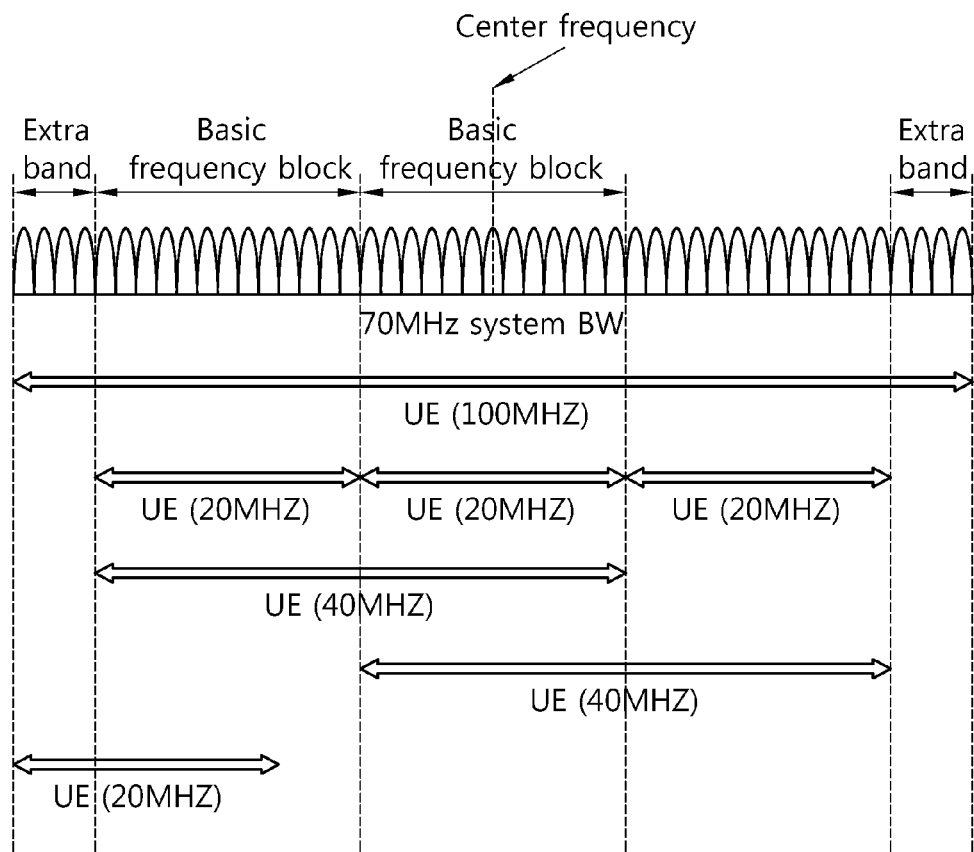
FIG. 18 shows an example of configuring a bandwidth of a carrier.

FIG. 18 shows an example of configuring a BW of a carrier. In order to support a system BW of 70 MHz, basic frequency blocks are symmetrically allocated about a center frequency. In this case, when a BW of the basic frequency block is 20 MHz, since the BW of the basic frequency block is not a divider of the system BW, there is an extra band having a smaller BW than that of the basic frequency block at both ends of the system BW.

Figure 19:
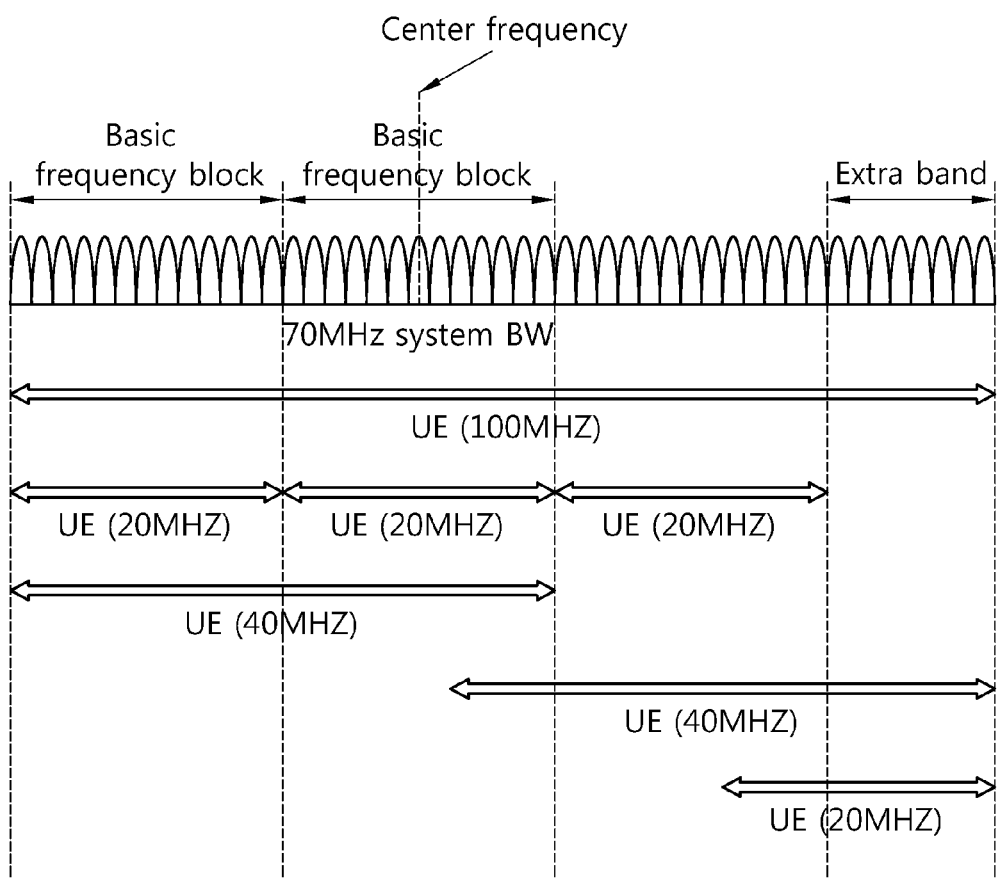
FIG. 19 shows another example of configuring a bandwidth of a carrier.

FIG. 19 shows another example of configuring a BW of a carrier. In order to support a system BW of 70 MHz, a frequency band is first allocated on a basic frequency block basis. Since a BW of the basic frequency block is not a divider of the system BW, there is an extra band having a smaller BW than that of the basic frequency block at an end of the system BW. The center frequency is a frequency corresponding to the center of the basic frequency block located in a center portion among basic frequency blocks.

Now, transmission of an ACK/NACK signal for HARQ in a system based on dynamic scheduling will be described. According to the proposed method, if a UE receives a plurality of PDSCHs through a plurality of carriers due to spectrum aggregation, only one ACK/NACK signal is transmitted instead of feeding back the ACK/NACK signal to each of the plurality of PDSCHs.

The plurality of PDSCHs may correspond to all carriers belonging to a system BW, or may correspond to some carriers belonging to the system BW. For example, 10 DL carriers exist in the system BW, and they may be divided into two carrier-groups. Each carrier group may be paired with at least one UL carrier, and one ACK/NACK signal may be fed back through a paired UL carrier for each carrier group. A correlation between the carrier group and the UL carrier may be predetermined, or may be reported by a BS to the UE by using a part of system information and/or dedicated signaling.

Two UL carriers may be paired with one carrier group. In this case, between the two UL carriers, a UL carrier through which an ACK/NACK signal is transmitted (such a UL carrier is referred to as a reference carrier) may be predetermined, or may be determined in association with a plurality of DL carriers on which DL data is transmitted.

For clarity of explanation, it is assumed hereinafter that the number of DL carriers is 3 and the number of UL carriers related to the DL carriers is 1. However, the number of DL carriers and/or the number of UL carriers are not limited thereto.

Figure 20:
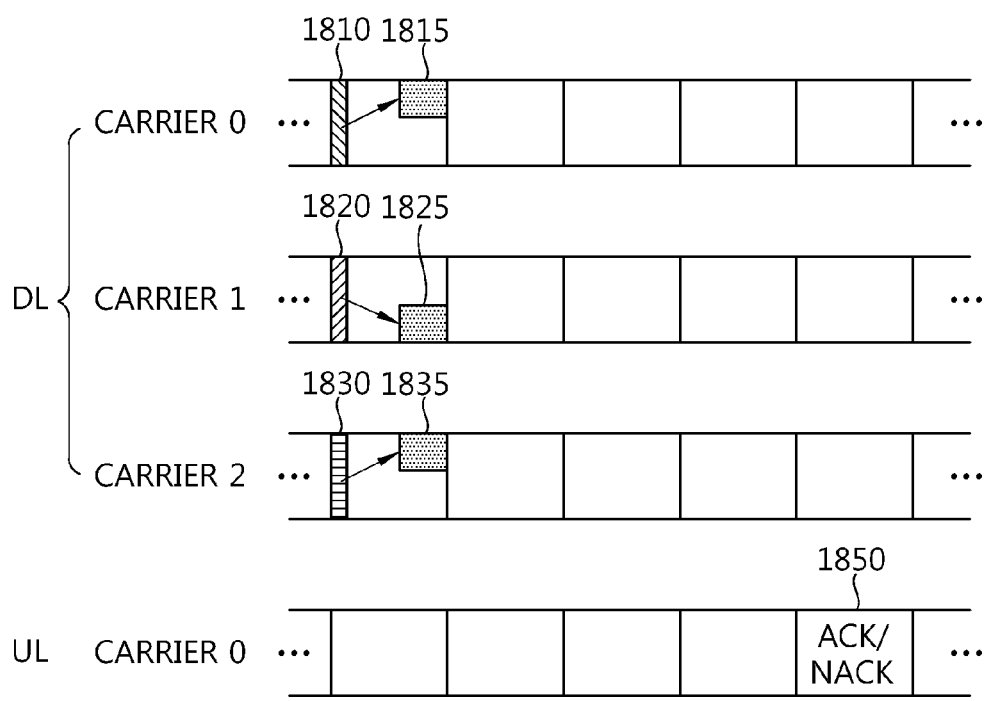
FIG. 20 shows an example of performing HARQ according to an embodiment of the present invention.

FIG. 20 shows an example of performing HARQ according to an embodiment of the present invention. In this case, DL data is transmitted on a DL control channel indicated by each PDCCH for each carrier, and one ACK/NACK signal is transmitted through a UL carrier with respect to a plurality of DL data. A BS transmits DL data 1815 on a PDSCH indicated by a first PDCCH 1810 through a carrier 0, transmits DL data 1825 on a PDSCH indicated by a second PDCCH 1820 through a carrier 1, and transmits DL data 1835 on a PDSCH indicated by a third PDCCH 1830 through a carrier 2. A UE transmits an ACK/NACK signal 1850 through a UL carrier 0 with respect to the 3 DL data 1815, 1825, and 1835.

If any one of the DL data 1815, 1825, and 1835 is unsuccessfully received, the ACK/NACK signal 1850 is a NACK signal, and if all of the DL data 1815, 1825, and 1835 are successfully received, the ACK/NACK signal 1850 is an ACK signal. If a CRC error occurs after decoding of DL data, it may be determined that reception of the DL data fails. In addition, if the UE detects missing of any one of the DL data 1815, 1825, and 1835, the ACK/NACK signal 1850 may be the NACK signal. The missing of the DL data implies that the BS transmits the DL data but the UE cannot receive the DL data at all. The BS may retransmit all of the DL data 1815, 1825, and 1835 upon receiving the NACK signal.

The UE may report reception information related to the DL data of which reception is successful or unsuccessful to the BS either together with the ACK/NACK signal 1850 or separately. The reception information may include the number of DL data which is successfully received by the UE (and/or an index of the DL data) and/or the number of DL data which is unsuccessfully received (and/or an index of the DL data). The reception information may include an index of the DL data which is unsuccessfully received or an index of a carrier for transmitting the DL data which is unsuccessfully received. Alternatively, the reception information may include an index of the DL data which is successfully received or an index of a carrier for transmitting the DL data which is successfully received. Upon receiving the NACK signal, the BS may retransmit the DL data which is unsuccessfully received by the UE.

The BS may report transmission confirmation information regarding the number of transmitted DL data to the UE. The UE may report reception confirmation information regarding the number of received DL data to the BS together with the ACK/NACK signal 1850 or separately. This is because some of the DL data 1815, 1825, and 1835 may be missing. The missing of the DL data may be caused by reception failure of the PDCCH. When the reception of the PDCCH fails, the UE can know whether the DL data is transmitted. For example, assume that the first DL data 1815 is missing due to reception failure of the first PDCCH 1810, and the UE receives the second and third DL data 1825 and 1835 and successfully decodes the second and third DL data. In this case, a problem may arise in that the UE feeds back an ACK signal and the BS regards that the first DL data 1815 is successfully transmitted. Therefore, the UE determines whether there is missing in PDCCH reception of the UE by using the transmission confirmation information received from the BS, and if there is missing in the PDCCH reception, the UE may transmit the NACK signal, or may not transmit the ACK/NACK signal

1850, or may transmit an additional signal indicating the missing to the BS. The BS may determine whether the UE normally receives the PDCCH by using the reception confirmation information received from the UE. When the UE fails to receive all of the PDSCHs transmitted by the BS due to a PDCCH detection error, the BS may retransmit all of previous PDSCHs. The transmission confirmation information transmitted by the BS may be transmitted through at least one of the three PDCCHs 1810, 1820, and 1830. For example, the number of DL data may be included in DCI on the second PDCCH 1820. Alternatively, the three PDCCHs 1810, 1820, and 1830 may have counters of which counter values are sequentially increased according to the number of DL data. For example, a counter value included in DCI of the first PDCCH 1810 may be set to 1, a counter value included in DCI of the second PDCCH 1820 may be set to 2, and a counter value included in DCI of the third PDCCH 1830 may be set to 3. Alternatively, the transmission confirmation information such as the number of received DL data may be transmitted through an additional channel instead of the PDCCH.

The reception confirmation information transmitted to the UE may be information that directly indicates the number of received DL data, or may be indicated implicitly through transmission of the ACK/NACK signal. For example, different resources may be used for transmission of the ACK/NACK signal 1850 according to the number of received DL data. For example, if the number of DL data is 1, the ACK/NACK signal 1850 is transmitted using a first ACK/NACK resource, and if the number of DL data is 2, the ACK/NACK signal 1850 is transmitted using a second ACK/NACK resource. For example, if the ACK/NACK signal is configured by using a cyclic shifted sequence, the first ACK/NACK resource is a first cyclic shift amount, and the second ACK/NACK resource is a second cyclic shift amount. The ACK/NACK resource may be associated with a resource (i.e., time, frequency, code, and/or carrier) of last DL data received by the UE. For example, assume that the first ACK/NACK resource is associated with a resource of the first DL data, and the second ACK/NACK resource is associated with a resource of the second DL data. When the UE transmits the ACK/NACK signal 1850 by using the first ACK/NACK resource even if the number of transmitted DL data is 2, the BS can know that the second DL data is missing.

Upon receiving the NACK signal, the BS may perform retransmission according to synchronous HARQ or asynchronous HARQ. Alternatively, retransmission may be performed based on control information of a PDCCH corresponding to each carrier or resource allocation information of the PDCCH.

If a plurality of UL carriers are present, there is a need to determine a specific UL carrier through which the ACK/NACK signal 1850 is transmitted. In one embodiment, a particular UL carrier may be predetermined for transmission of the ACK/NACK signal 1850. In another embodiment, a UL carrier through which the ACK/NACK signal 1850 is transmitted may be reported by the BS. This may be reported by the BS to the UE by using a PDCCH, a higher layer signal, and/or system information. In another embodiment, a UL carrier for the ACK/NACK signal 1850 may be determined based on a DL carrier through which the DL data is transmitted.

A position of a subframe in which the ACK/NACK signal 1850 is transmitted may be predetermined. Although it is shown herein that the ACK/NACK signal 1850 is transmitted in an $(n+4)^{th}$ subframe when DL data is transmitted through an $n^{th}$ subframe, this is for exemplary purposes only. Alternatively, the position of the subframe in which the ACK/NACK signal 1850 is transmitted may be reported by the UE to the BS explicitly or implicitly through the PDCCH.

Time, code, and/or frequency resources (referred to as ACK/NACK resources) used for transmission of the ACK/NACK signal 1850 may be reported by the BS to the UE explicitly or implicitly. The ACK/NACK resource may be determined using control information on the PDCCH in a particular DL carrier. Alternatively, the ACK/NACK resource may be determined using a resource of the PDCCH in the particular DL carrier (e.g., a reference carrier described below). Also, the ACK/NACK resource may be determined by using a parameter transmitted through higher layer signaling. For example, the ACK/NACK resource may be determined by using a CCE index (e.g., a lowest CCE index) used for transmission of the PDCCH in the particular DL carrier.

When the ACK/NACK signal is transmitted for each carrier, an overhead caused by transmission of the ACK/NACK signal may occur, and complexity may increase due to an operation of multiple HARQ processes. Therefore, multiple PDSCHs transmitted through multiple carriers may be bundled to simply perform HARQ by transmitting one ACK/NACK signal.

Figure 21:
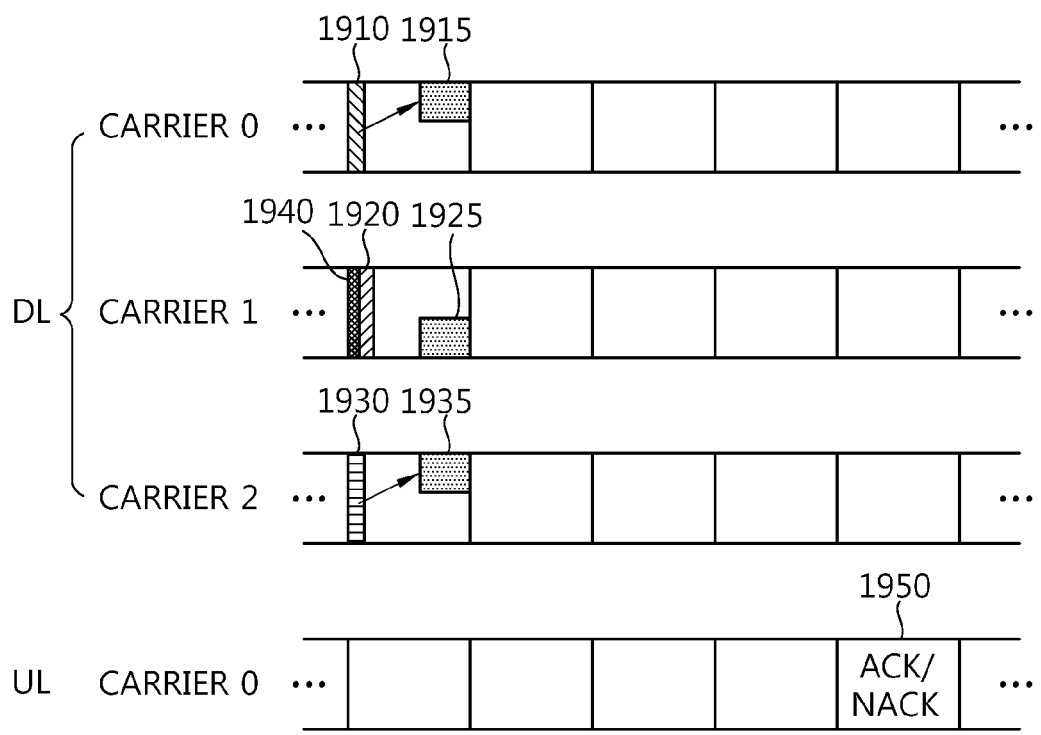
FIG. 21 shows another example of performing HARQ according to another embodiment of the present invention.

FIG. 21 shows another example of performing HARQ according to another embodiment of the present invention. This is identical to the embodiment of FIG. 20 in a sense that DL data 1915, 1925, and 1935 are sent respectively through PDCCHs 1910, 1920, and 1930 through respective carriers and one ACK/NACK signal 1950 is sent for a plurality of DL data 1915, 1925, and 1935, but is different in a sense that common control information 1940 is transmitted through a carrier 1. The carrier 1 through which the common control information 1940 is transmitted is called a reference carrier. The reference carrier may be selected from at least one of a plurality of carriers, and there is no restriction on the position or number of the reference carriers.

The common control information 1940 may include information related to available carriers, carrier allocation, higher control information for each carrier, a cell-based system parameter, etc. A UE may first receive the common control information 1940 and then may receive individual control information on a PDCCH transmitted through each carrier.

If any one of the DL data 1915, 1925, and 1935 is unsuccessfully received, the ACK/NACK signal 1950 is a NACK signal, and if all of the DL data 1915, 1925, and 1935 are successfully received, the ACK/NACK signal 1950 is an ACK signal. If a CRC error occurs after decoding of DL data, it may be determined that reception of the DL data fails. In addition, if the UE detects missing of any one of the DL data 1915, 1925, and 1935, the ACK/NACK signal 1950 may be the NACK signal. A BS may retransmit all of the DL data 1915, 1925, and 1935 upon receiving the NACK signal.

The UE may report reception information related to the DL data of which reception is successful or unsuccessful to the BS either together with the ACK/NACK signal 1950 or separately. The reception information may include the number of DL data which is successfully received by the UE (and/or an index of the DL data) and/or the number of DL data which is unsuccessfully received (and/or an index of the DL data). The reception information may include an index of the DL data which is unsuccessfully received or an index of a carrier for transmitting the DL data which is unsuccessfully received. Alternatively, the reception information may include an index of the DL data which is successfully received or an index of a carrier for transmitting the DL data which is successfully received. Upon receiving the NACK signal, the BS may retransmit the DL data which is unsuccessfully received by the UE.

The BS may report transmission confirmation information regarding the number of transmitted DL data to the UE. The UE may report reception confirmation information regarding the number of received DL data to the BS together with the ACK/NACK signal 1950 or separately. The transmission confirmation information may be included in the common control information 1940. The reception confirmation information transmitted by the UE may be information that directly indicates the number of received DL data, or may be indicated implicitly through transmission of the ACK/NACK signal 1950. For example, different resources may be used for transmission of the ACK/NACK signal 1950 according to the number of received DL data. For example, if the number of DL data is 1, the ACK/NACK signal 1950 is transmitted using a first ACK/NACK resource, and if the number of DL data is 2, the ACK/NACK signal 1950 is transmitted using a second ACK/NACK resource.

Upon receiving the NACK signal, the BS may perform retransmission according to synchronous HARQ or asynchronous HARQ. Alternatively, retransmission may be performed based on control information of a PDCCH corresponding to each carrier or resource allocation information of the PDCCH.

The ACK/NACK signal 1950 may be transmitted through a UL carrier corresponding to the reference carrier. Alternatively, the common control information 1940 may include information regarding the UL carrier through which the ACK/NACK signal 1950 is transmitted.

The common control information 1940 may include information regarding a position of a subframe in which the ACK/NACK signal 1950 is transmitted.

The common control information 1940 may include information regarding an ACK/NACK resource used for transmission of the ACK/NACK signal 1950.

Figure 22:
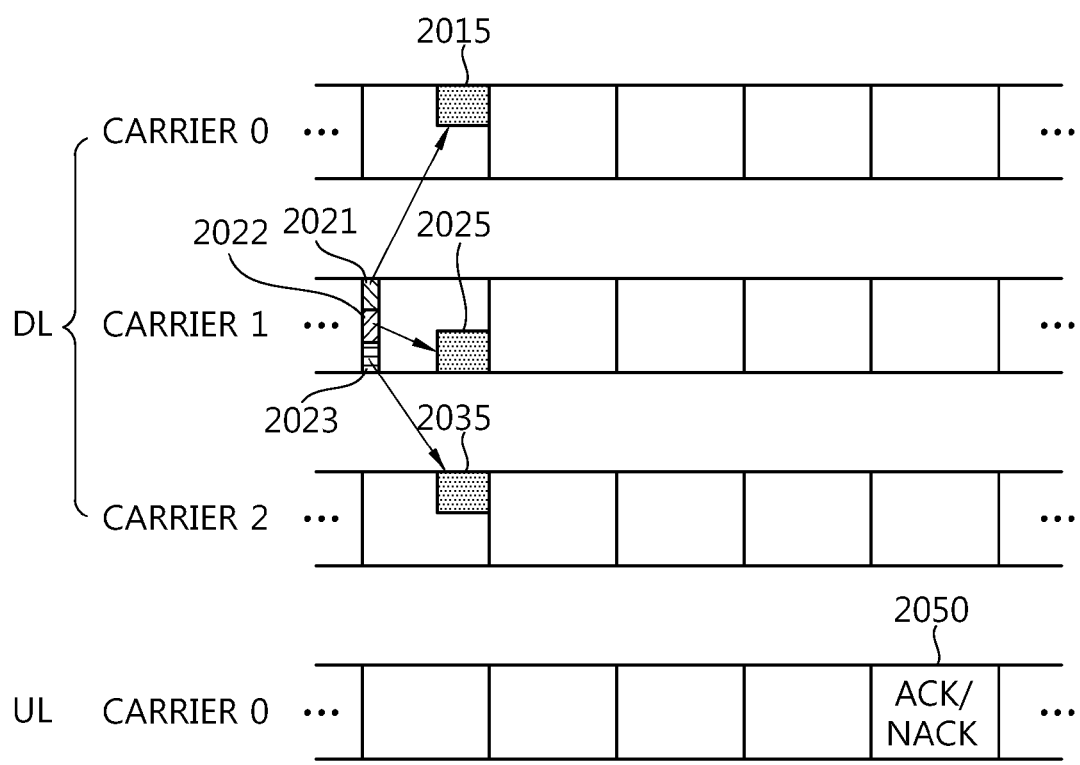
FIG. 22 shows another example of performing HARQ according to another embodiment of the present invention.

FIG. 22 shows another example of performing HARQ according to another embodiment of the present invention. A carrier 1 which is a reference carrier is used to indicate a PDSCH corresponding to each carrier on three PDCCHs 2021, 2022, and 2023. The first PDCCH 2021 indicates first DL data 2015 transmitted through a carrier 0, the second PDCCH 2022 indicates second DL data 2025 transmitted through the carrier 1, and the third PDCCH 2023 indicates third DL data 2035 transmitted through a carrier 2. That is, control information for receiving the DL data 2015, 2025, and 2035 for the plurality of carriers is transmitted through the reference carrier. The reference carrier may be selected from at least one of a plurality of carriers, and there is no restriction on the position and number of the reference carriers. Since the plurality of carriers respectively correspond to the PDCCHs 2021, 2022, and 2023, this is called separate coding. The separate coding uses a separate PDCCH for each carrier. In the separate coding, a CRC is attached to each PDCCH, and coding is performed separately.

A UE transmits one ACK/NACK signal 2050 through a UL carrier 0 with respect to the three DL data 2015, 2025, and 2035. If any one of the DL data 2015, 2025, and 2035 is unsuccessfully received, the ACK/NACK signal 2050 is a NACK signal, and if all of the DL data 2015, 2025, and 2035 are successfully received, the ACK/NACK signal 2050 is an ACK signal. If a CRC error occurs after decoding of DL data, it may be determined that reception of the DL data fails. A BS may retransmit all of the DL data 2015, 2025, and 2035 upon receiving the NACK signal.

The UE may report reception information related to the DL data of which reception is successful or unsuccessful to the BS either together with the ACK/NACK signal 2050 or separately. The reception information may include the number of DL data which is successfully received by the UE (and/or an index of the DL data) and/or the number of DL data which is unsuccessfully received (and/or an index of the DL data). The reception information may include an index of the DL data which is unsuccessfully received or an index of a carrier for transmitting the DL data which is unsuccessfully received. Alternatively, the reception information may include an index of the DL data which is successfully received or an index of a carrier for transmitting the DL data which is successfully received. Upon receiving the NACK signal, the BS may retransmit the DL data which is unsuccessfully received by the UE.

The BS may report transmission confirmation information regarding the number of transmitted DL data to the UE. The UE may report reception confirmation information regarding the number of received DL data to the BS together with the ACK/NACK signal 2050 or separately. The transmission confirmation information may be transmitted through the reference carrier. The reception confirmation information transmitted by the UE may be information that directly indicates the number of received DL data, or may be indicated implicitly through transmission of the ACK/NACK signal 2050. For example, different resources may be used for transmission of the ACK/NACK signal 2050 according to the number of received DL data. For example, if the number of DL data is 1, the ACK/NACK signal 2050 is transmitted using a first ACK/NACK resource, and if the number of DL data is 2, the ACK/NACK signal 2050 is transmitted using a second ACK/NACK resource.

Upon receiving the NACK signal, the BS may perform retransmission according to synchronous HARQ or asynchronous HARQ. Alternatively, retransmission may be performed based on control information of a PDCCH corresponding to each carrier or resource allocation information of the PDCCH.

If a plurality of UL carriers are present, there is a need to determine a specific UL carrier through which the ACK/NACK signal 2050 is transmitted. In one embodiment, a particular UL carrier may be reserved for transmission of the ACK/NACK signal 2050. In another embodiment, a UL carrier through which the ACK/NACK signal 2050 is transmitted may be reported by the BS. This may be reported by the BS to the UE by using a PDCCH, a higher layer signal, and/or system information. In another embodiment, a UL carrier for the ACK/NACK signal 2050 may be determined based on a DL carrier through which the DL data is transmitted. In another embodiment, the ACK/NACK signal 2050 may be transmitted through a UL carrier corresponding to the reference carrier.

A position of a subframe in which the ACK/NACK signal 2050 is transmitted may be predetermined. Although it is shown herein that the ACK/NACK signal 2050 is transmitted in an $(n+4)^{th}$ subframe when DL data is transmitted through an $n^{th}$ subframe, this is for exemplary purposes only. Alternatively, the position of the subframe in which the ACK/NACK signal 2050 is transmitted may be reported by the UE to the BS explicitly or implicitly through the PDCCH.

ACK/NACK resources used for transmission of the ACK/NACK signal 2050 may be reported by the BS to the UE explicitly or implicitly. The ACK/NACK resource may be determined using control information on the PDCCH in the reference carrier. Alternatively, the ACK/NACK resource may be determined using a resource of the PDCCH in the reference carrier. Also, the ACK/NACK resource may be determined by using a parameter transmitted through higher layer signaling. For example, the ACK/NACK resource may be determined by using a CCE index used for transmission of the PDCCH in the reference carrier.

When the ACK/NACK signal is transmitted for each carrier, an overhead caused by transmission of the ACK/NACK signal may occur, and complexity may increase due to an operation of multiple HARQ processes. Therefore, multiple PDSCHs transmitted through multiple carriers may be bundled to simply perform HARQ by transmitting one ACK/NACK signal.

Figure 23:
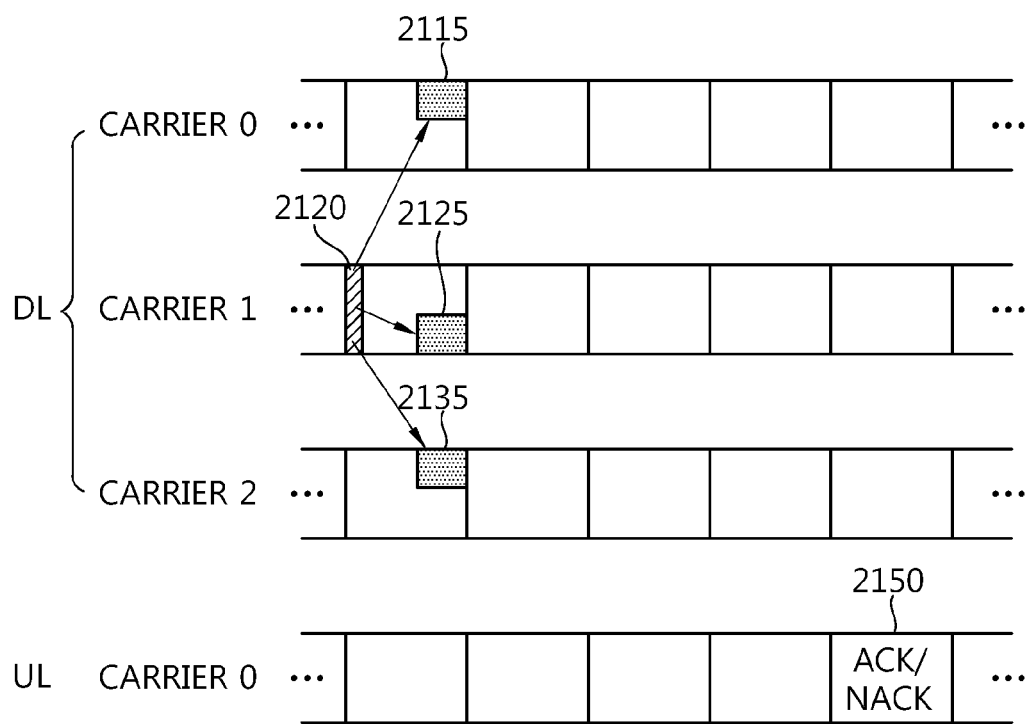
FIG. 23 shows another example of performing HARQ according to another embodiment of the present invention.

FIG. 23 shows another example of performing HARQ according to another embodiment of the present invention. A carrier 1 which is a reference carrier is used to indicate a PDSCH corresponding to each carrier on one PDCCH 2120. This embodiment is different from the embodiment of FIG. 22 in a sense that control information for receiving DL data 2115, 2125, and 2135 for a plurality of carriers is transmitted on one PDCCH 2120. The PDCCH 2120 indicates the first DL data 2115 transmitted through a carrier 0, the second DL data 2125 transmitted through the carrier 1, and third DL data 2135 transmitted through a carrier 2. Since the plurality of carriers correspond to one PDCCH 2120, this is called joint coding. The joint coding is coding in which one PDCCH is used to allocate the PDSCH for each carrier.

A UE transmits one ACK/NACK signal 2150 through a UL carrier 0 with respect to the three DL data 2115, 2125, and 2135. If any one of the DL data 2115, 2125, and 2135 is unsuccessfully received, the ACK/NACK signal 2150 is a NACK signal, and if all of the DL data 2115, 2125, and 2135 are successfully received, the ACK/NACK signal 2150 is an ACK signal. If a CRC error occurs after decoding of DL data, it may be determined that reception of the DL data fails. A BS may retransmit all of the DL data 2115, 2125, and 2135 upon receiving the NACK signal.

The UE may report reception information related to the DL data of which reception is successful or unsuccessful to the BS either together with the ACK/NACK signal 2150 or separately. The reception information may include an index of the DL data which is unsuccessfully received or an index of a carrier for transmitting the downlink data which is unsuccessfully received. Alternatively, the reception information may include an index of the DL data which is successfully received or an index of a carrier for transmitting the DL data which is successfully received. Upon receiving the NACK signal, the BS may retransmit the DL data which is unsuccessfully received by the UE.

Transmission confirmation information regarding the number of DL data transmitted by the BS or reception confirmation information regarding the number of DL data received by the UE may be unnecessary when using the joint-coded PDCCH 2120. This is because the UE cannot receive DL data when reception of the joint-coded PDCCH 2120 fails and thus does not send the ACK/NACK signal 2150.

Upon receiving the NACK signal, the BS may perform retransmission according to synchronous HARQ or asynchronous HARQ. Alternatively, retransmission may be performed based on control information of a PDCCH corresponding to each carrier or resource allocation information of the PDCCH.

If a plurality of UL carriers are present, there is a need to determine a specific UL carrier through which the ACK/NACK signal 2150 is transmitted. In one embodiment, a particular UL carrier may be predetermined for transmission of the ACK/NACK signal 2150. In another embodiment, a UL carrier through which the ACK/NACK signal 2150 is transmitted may be reported by the BS. This may be reported by the BS to the UE by using a PDCCH, a higher layer signal, and/or system information. In another embodiment, a UL carrier for the ACK/NACK signal 2150 may be determined based on a DL carrier through which the DL data is transmitted. In another embodiment, the ACK/NACK signal 2150 may be transmitted through a UL carrier corresponding to the reference carrier.

A position of a subframe in which the ACK/NACK signal 2150 is transmitted may be predetermined. Although it is shown herein that the ACK/NACK signal 2150 is transmitted in an $(n+4)^{th}$ subframe when DL data is transmitted through an $n^{th}$ subframe, this is for exemplary purposes only. Alternatively, the position of the subframe in which the ACK/NACK signal 2150 is transmitted may be reported by the UE to the BS explicitly or implicitly through the PDCCH.

ACK/NACK resources used for transmission of the ACK/NACK signal 2150 may be reported by the BS to the UE explicitly or implicitly. The ACK/NACK resource may be determined using control information on the PDCCH 2120 in the reference carrier. Alternatively, the ACK/NACK resource may be determined using a resource of the PDCCH 2120 in the reference carrier Also, the ACK/NACK resource may be determined by using a parameter transmitted through higher layer signaling. For example, the ACK/NACK resource may be determined by using a CCE index (e.g., a lowest CCE index) used for transmission of the PDCCH 2120 in the reference carrier.

Figure 24:
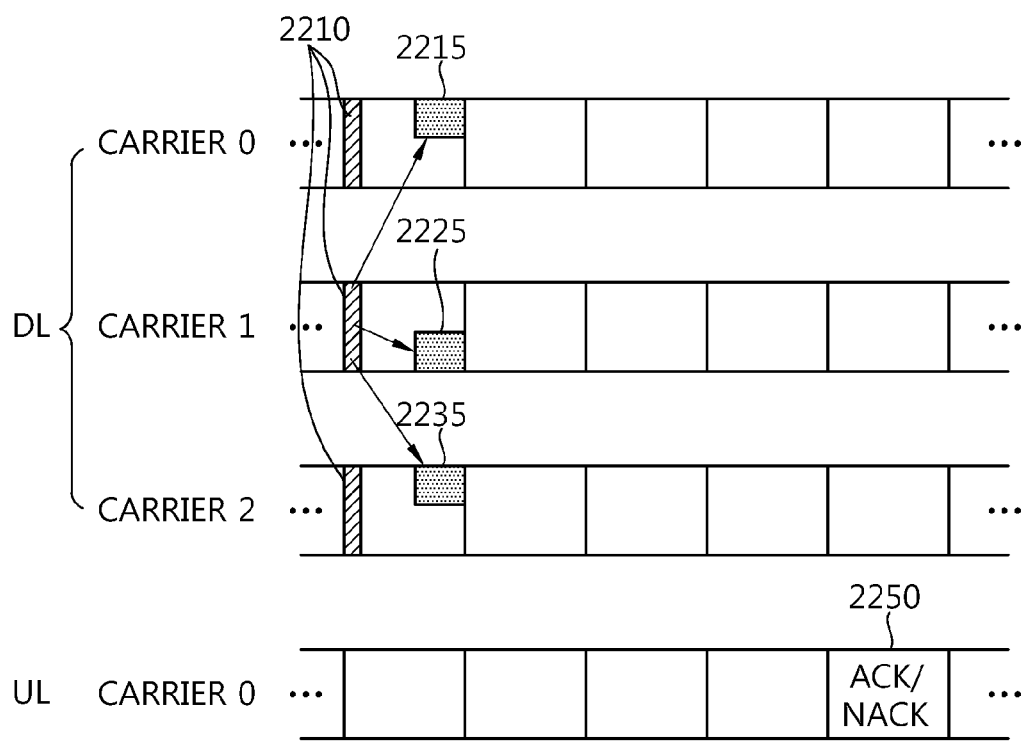
FIG. 24 shows another example of performing HARQ according to another embodiment of the present invention.

FIG. 24 shows another example of performing HARQ according to another embodiment of the present invention. A PDCCH 2210 for PDSCHs with respect to all DL carriers are transmitted across a full system bandwidth. One DCI is transmitted on the PDCCH 2210 across a carrier 0, a carrier 1, and a carrier 2. The PDCCH 2210 indicates first DL data 2215 transmitted through the carrier 0, second DL data 2225 transmitted through the carrier 1, and third DL data 2235 transmitted through the carrier 2.

A UE transmits an ACK/NACK signal 2250 through a UL carrier 0 with respect to the 3 DL data 2215, 2225, and 2235. If any one of the DL data 2215, 2225, and 2235 is unsuccessfully received, the ACK/NACK signal 2250 is a NACK signal, and if all of the DL data 2215, 2225, and 2235 are successfully received, the ACK/NACK signal 2250 is an ACK signal. If a CRC error occurs after decoding of DL data, it may be determined that reception of the DL data fails. A BS may retransmit all of the DL data 2215, 2225, and 2235 upon receiving the NACK signal.

The UE may report reception information related to the DL data of which reception is successful and/or unsuccessful to the BS either together with the ACK/NACK signal 2250 or separately. The reception information may include an index of the DL data which is unsuccessfully received or an index of a carrier for transmitting the DL data which is unsuccessfully received. Alternatively, the reception information may include an index of the DL data which is successfully received or an index of a carrier for transmitting the DL data which is successfully received. Upon receiving the NACK signal, the BS may retransmit the DL data which is unsuccessfully received by the UE.

Transmission confirmation information regarding the number of DL data transmitted by the BS or reception confirmation information regarding the number of DL data received by the UE may be unnecessary when using the joint-coded PDCCH 2210. This is because the UE cannot receive DL data when reception of the joint-coded PDCCH 2210 fails and thus does not send the ACK/NACK signal 2250.

Upon receiving the NACK signal, the BS may perform retransmission according to synchronous HARQ or asynchronous HARQ. Alternatively, retransmission may be performed based on control information of the PDCCH 2210 or resource allocation information of the PDCCH 2210.

If a plurality of UL carriers are present, there is a need to determine a specific UL carrier through which the ACK/NACK signal 2250 is transmitted. In one embodiment, a particular UL carrier may be predetermined for transmission of the ACK/NACK signal 2250. In another embodiment, a UL carrier through which the ACK/NACK signal 2250 is transmitted may be reported by the BS. This may be reported by the BS to the UE by using a PDCCH, a higher layer signal, and/or system information. In another embodiment, a UL carrier for the ACK/NACK signal 2250 may be determined based on a DL carrier through which the DL data is transmitted.

A position of a subframe in which the ACK/NACK signal 2250 is transmitted may be predetermined. Although it is shown herein that the ACK/NACK signal 2250 is transmitted in an $(n+4)^{th}$ subframe when DL data is transmitted through an $n^{th}$ subframe, this is for exemplary purposes only. Alternatively, the position of the subframe in which the ACK/NACK signal 2250 is transmitted may be reported by the UE to the BS explicitly or implicitly through the PDCCH.

ACK/NACK resources used for transmission of the ACK/NACK signal 2250 may be reported by the BS to the UE explicitly or implicitly. The ACK/NACK resource may be determined using a resource of the PDCCH 2210.

The embodiments above in which one ACK/NACK signal is fed back for multiple PDSCHs can be modified variously. For example, assume that there are 5 DL carriers and 3 UL carriers, a first UL carrier is paired with 3 DL carriers, and the remaining 2 UL carriers are respectively paired with the remaining 2 DL carriers. Then, an ACK/NACK signal for 3 DL carriers can be transmitted through a first UL carrier, and an ACK/NACK signal for the remaining 2 DL carriers can be transmitted respectively through the remaining 2 UL carriers.

If the number of UL carriers is greater than the number of DL carriers, a reference UL carrier may be determined among a plurality of UL carriers so that the ACK/NACK signal is transmitted through the reference UL carrier.

If one ACK/NACK signal is transmitted for a plurality of DL data transmitted through a plurality of DL carriers, the number of DL data in association with one ACK/NACK signal (or the number of PDSCHs) can be limited to ensure an error rate. For example, if 5 DL carriers are paired with one UL carrier, an ACK signal is fed back only when all of 5 DL data transmitted through the 5 DL carriers are successfully received, and thus the error rate may increase. For example, assume that a 2-bit ACK/NACK signal can be used, and 5 DL carriers are used. When x denotes the number of DL carriers of a first DL carrier group indicated by a first ACK/NACK bit, and y denotes the number of DL carriers of a second DL carrier group indicated by a second ACK/NACK bit, a possible combination is (x,y)=(1, 4), (2,3), (0,5). A DL carrier group bundled to each ACK/NACK bit may be predetermined, or system information, an RRC message, or the like may be reported by the BS to the UE.

A rule for a mechanism of relating a plurality of DL carriers to UL carriers may be defined. For example, the DL carriers may be sequentially related to UL carriers according to DL carrier indices.

The UL carriers related to the DL carriers may be switched. That is, a UL carrier through which the UL ACK/NACK is transmitted may be switched by a specific method. For one example, assume that first and second DL carriers are sequentially related to first and second UL carriers, respectively. According to a specific event or a specific event, the first DL carrier may be related to the second UL carrier, and the second DL carrier may be related to the first UL carrier. For another example, when the UE uses two DL carriers and two UL carriers, the UE may transmit a UL ACK/NACK signal for a PDSCH transmitted through the first DL carrier in a subframe through the first UL carrier. The UE may transmit a UL ACK/NACK signal for a PDSCH received through the first DL carrier in a next subframe through the second UL carrier.

The aforementioned embodiments are also applicable to multiple input multiple output (MIMO) transmission. A MIMO system can transmit a plurality of DL data per carrier. For a plurality of DL data received through at least one DL carrier, the UE may feed back one ACK/NACK signal through one UL carrier. For example, one ACK/NACK signal may be an ACK/NACK signal for two DL data received through a first DL carrier and one DL data received through two DL carriers.

Although DL HARQ, i.e., a case where one ACK/NACK signal is transmitted for a plurality of DL data, is described in the aforementioned embodiments, the aforementioned method of performing HARQ is also applicable to UL HARQ. That is, those ordinary skilled in the art may easily apply technical features of the present invention to a case where the BS transmits an ACK/NACK signal through one DL carrier with respect to a plurality of UL data received through a plurality of UL carriers.

Figure 25:
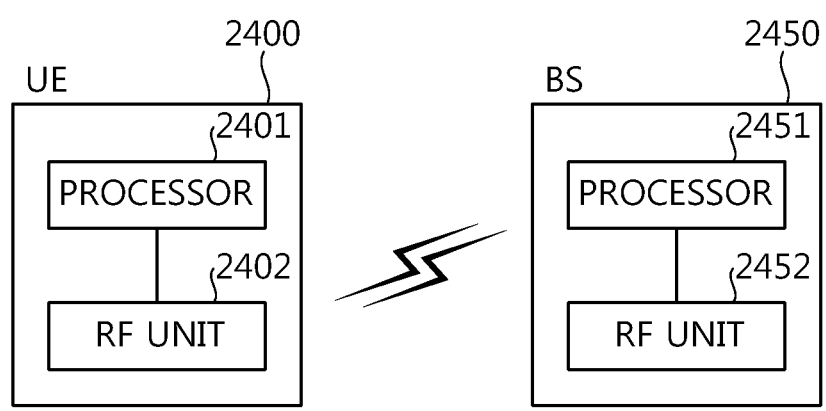
FIG. 25 is a block diagram showing a wireless communication system for implementing an embodiment of the present invention.

FIG. 25 is a block diagram showing a wireless communication system for implementing an embodiment of the present invention. A UE 2400 and a BS 2450 communicate with each other through a radio channel. The UE 2400 includes a processor 2401 and a radio frequency (RF) unit 2402. The RF unit 2402 transmits and/or receives a radio signal. The processor 2401 is coupled to the RF unit 2402 to implement a method of performing HARQ according to embodiments of the present invention. The BS 2450 includes a processor 2451 and an RF unit 2452. The RF unit 2452 transmits and/or receives a radio signal. The processor 2451 is coupled to the RF unit 2452 to implement the method of performing HARQ according to the exemplary embodiment of the present invention.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of performing hybrid automatic repeat request (HARQ) in a multiple carrier system, the method comprising:

receiving, by a user equipment (UE) capable of aggregating a plurality of downlink component carriers each of which provides a physical downlink shared channel (PDSCH), a plurality of downlink data on plural PDSCHs through the plurality of downlink component carriers; and transmitting, by the UE, one acknowledgement (ACK)/not-acknowledgement (NACK) signal for the plurality of downlink data through one uplink component carrier, wherein the aggregation is supported for contiguous downlink component carriers and non-contiguous downlink component carriers, and wherein the one ACK/NACK signal is one ACK signal when all of the plurality of downlink data are successfully received and the one ACK/NACK signal is one NACK signal when even one of the plurality of downlink data is unsuccessfully received and the uplink component carrier is associated with the plurality of downlink component carriers.

2. The method of claim 1, wherein each downlink data is received on the PDSCH through each downlink component carrier, and each PDSCH is indicated by downlink control information (DCI) on a physical downlink control channel (PDCCH).

3. The method of claim 2, wherein the PDCCH is transmitted for each downlink component carrier, and each PDCCH indicates a PDSCH of a corresponding downlink component carrier.

4. The method of claim 2, wherein a plurality of PDCCHs are transmitted through one downlink component carrier among the plurality of downlink component carriers, and the plurality of PDCCHs indicate respective PDSCHs of the plurality of downlink component carriers.

5. The method of claim 2, wherein one PDCCH is transmitted through a single downlink component carrier among the plurality of downlink component carriers, and the single PDCCH indicates each of the PDSCH of the plurality of downlink component carriers.

6. The method of claim 1, further comprising:

receiving the plurality of downlink data retransmitted through the plurality of downlink component carriers after transmission of the NACK signal.

7. The method of claim 6, further comprising:

transmitting the ACK/NACK signal for the plurality of retransmitted downlink data through another uplink component carrier different from the uplink component carrier.

8. The method of claim 1, further comprising:

transmitting, to a base station, reception information regarding downlink data which is successfully or unsuccessfully received.

9. The method of claim 1, further comprising:

receiving transmission confirmation information regarding the number of the plurality of downlink data transmitted by a base station.

10. The method of claim 9, further comprising:

transmitting, to the base station, reception confirmation information regarding the number of downlink data received by the user equipment.

11. The method of claim 1, further comprising:

determining an uplink component carrier through which the ACK/NACK signal is transmitted based on information received through at least one downlink component carrier among the plurality of downlink component carriers.

12. The method of claim 1, wherein the downlink component carrier spaces up to 20 Mhz and the aggregation is supported up to 100 Mhz.

* * * * *